(12) United States Patent
Widzgowski

(10) Patent No.: US 11,686,994 B2
(45) Date of Patent: Jun. 27, 2023

(54) METHOD AND SIGNAL GENERATOR FOR DRIVING AN ACOUSTO-OPTIC ELEMENT

(71) Applicant: Leica Microsystems CMS GmbH, Wetzlar (DE)

(72) Inventor: Bernd Widzgowski, Dossenheim (DE)

(73) Assignee: LEICA MICROSYSTEMS CMS GMBH, Wetzlar (DE)

( * ) Notice: Subject to any disclaimer, the term of this patent is extended or adjusted under 35 U.S.C. 154(b) by 133 days.

(21) Appl. No.: 16/711,483

(22) Filed: Dec. 12, 2019

(65) Prior Publication Data

US 2020/0192182 A1 Jun. 18, 2020

(30) Foreign Application Priority Data

Dec. 14, 2018 (DE) .................... 10 2018 132 327.1

(51) Int. Cl.
*G02F 1/33* (2006.01)
*G02B 21/00* (2006.01)
(Continued)

(52) U.S. Cl.
CPC ........... *G02F 1/33* (2013.01); *G02B 21/0076* (2013.01); *G02F 1/11* (2013.01); *G02F 1/113* (2013.01); *H01S 3/0057* (2013.01)

(58) Field of Classification Search
CPC .. G02B 21/00; G02B 21/002; G02B 21/0076; G02B 21/0036; G02B 21/0092; G02B 27/09; G02F 1/33; G02F 1/332; G02F 1/335; G02F 1/113; G02F 1/3134; G02F 2201/16; G02F 2203/24; G02F 1/11;
(Continued)

(56) References Cited

U.S. PATENT DOCUMENTS 3,531,184 A * 9/1970 Adler ...................... G02F 1/332
359/310
3,783,185 A 1/1974 Spaulding
(Continued)

FOREIGN PATENT DOCUMENTS

CN 1888818 A 1/2007
DE 2303948 A1 8/1973
(Continued)

OTHER PUBLICATIONS

Voloshinov, V. B. et al., "Electric Phase Delays in Tunable Acousto-Optic Filters Applying Extended Transducers," 2012 IEEE International Ultrasonics Symposium, USA, IEEE, Oct. 7, 2012, pp. 1-4.

*Primary Examiner* — Jie Lei
(74) *Attorney, Agent, or Firm* — Leydig, Voit & Mayer, Ltd.

(57) ABSTRACT

A method for driving an acousto-optic element with an acousto-optic crystal and a piezoelectric transducer for setting the acousto-optic crystal in mechanical vibration includes driving the piezoelectric transducer with a drive signal with at least one drive frequency. The at least one drive frequency in alternation takes on a plurality of different values around a center frequency during a passage of a mechanical vibrational wave through the acousto-optic crystal, such that a grating that is produced owing to density fluctuations in the acousto-optic crystal exhibits different grating spacings at the same time.

17 Claims, 3 Drawing Sheets

(51) Int. Cl.
 *G02F 1/11* (2006.01)
 *H01S 3/00* (2006.01)

(58) Field of Classification Search
 CPC ........ H01S 3/0057; H01S 3/106; H01S 3/068; H01S 3/117
 USPC ................ 359/285–287, 238, 245, 278, 305, 359/310–312, 321
 See application file for complete search history.

(56) References Cited

U.S. PATENT DOCUMENTS

| | | | |
|---|---|---|---|
| 3,935,566 | A | 1/1976 | Snopko |
| 6,072,813 | A | 6/2000 | Tournois |
| 6,154,307 | A | 11/2000 | Veronesi et al. |
| 9,104,087 | B2 | 8/2015 | Kirkby et al. |
| 2011/0304900 | A1 | 12/2011 | Widzgowski et al. |
| 2014/0029081 | A1 | 1/2014 | Kirkby et al. |
| 2019/0196233 | A1 | 6/2019 | Mrawek et al. |
| 2019/0339500 | A1 | 11/2019 | Widzgowski et al. |
| 2020/0050029 | A1 | 2/2020 | Birk |

FOREIGN PATENT DOCUMENTS

| | | |
|---|---|---|
| DE | 102013201968 A1 | 8/2014 |
| DE | 102017223759 B3 | 11/2018 |
| GB | 2427034 A | 12/2006 |
| JP | S50-075054 A | 6/1975 |
| JP | 2000149337 A | 5/2000 |
| JP | 2013-534643 A | 9/2013 |
| JP | 2017522187 A | 8/2017 |
| WO | WO 2015/178921 A1 | 11/2015 |
| WO | WO 2017/207664 A1 | 12/2017 |
| WO | WO 2018/197546 A1 | 11/2018 |

\* cited by examiner

METHOD AND SIGNAL GENERATOR FOR DRIVING AN ACOUSTO-OPTIC ELEMENT

CROSS-REFERENCE TO PRIOR APPLICATIONS

Priority is claimed to German Patent Application No. DE 10 2018 132 327.1, filed on Dec. 14, 2018, the entire disclosure of which is hereby incorporated by reference herein.

FIELD

The present invention relates to a method and to a signal generator for driving an acousto-optic element, to an arrangement of such a signal generator and an acousto-optic element, and to a microscope having such an arrangement.

BACKGROUND

A significant challenge in areas of microscopy is the provision of excitation light having one or more specified wavelengths, independently of the method that is being used. Depending on the type of the microscopy method and/or on the type of the sample, one or more excitation light beams, which generally must have specified spectral properties, may be necessary.

For example, it is important in the field of fluorescence microscopy to use light having the wavelength that excites fluorescence. Different wavelengths are needed in particular when the sample contains fluorescence substances having different emission wavelengths.

In the field of confocal scanning microscopy, it is of particular interest to adapt the intensities for specific wavelengths or to switch specific wavelengths on or off.

To this end, wavelength-selective elements that rely on the acousto-optic effect can be used. Such acousto-optic elements generally have what is known as an acousto-optic crystal that is set in vibration using an acoustic transducer. Such a transducer generally comprises a piezoelectric material and two or more electrodes contacting said material. By electrically connecting the electrodes to radio frequencies typically ranging between 10 MHz and a few GHz, the piezoelectric material is excited to vibrate, so that an acoustic wave can be produced that travels through the crystal. Acousto-optic crystals are characterized in that the resulting sound wave changes the optical properties of the crystal.

Examples of such acousto-optic elements, which can also be advantageously used within the scope of the invention, are acousto-optic tunable filters (AOTF), acousto-optic modulators (AOM), acousto-optic deflectors (AOD), acousto-optic beam splitters (AOBS), and acousto-optic beam combiners (AOBM).

A particular challenge when using acousto-optic elements is the driving thereof. The radio-frequency electrical signals for the transducer are typically produced in a frequency generator (for example a voltage-controlled oscillator (VCO), a phase-locked loop (PLL), or a synthesizer in accordance with the DDS (direct digital synthesis) method) and amplified using radio-frequency amplifiers such that the amplitude is large enough to set the crystal in vibration. If a plurality of different drive frequencies are applied at the same time, light beams of a plurality of wavelengths can be deflected at the same time (for example in the case of an AOTF, AOBS, AOBM, AOM) or one wavelength of an incident light beam can be deflected into a plurality of light beams of different directions at the same time (for example in the case of an AOD).

The passband bandwidth of acousto-optic modulators can be varied by constructive measures such as the design of the crystal geometry and/or of the transducer and, in addition, by the curve shape of the drive signal. For example, in the second case, a plurality of densely located frequencies can be superposed and fed into the crystal, resulting in an overlap of the individual passband regions to form a greater passband region.

A disadvantage of these methods is that, in the case of the constructive solution, the broadening of the passband curve is not variable. When different passband widths are required, the crystals need to be exchanged. Furthermore, the passband widths in the entire spectral region of the crystal are specified by the geometry. In the case of the superposition solution, high peak powers are obtained that must be processed by the RF amplifier used. To ensure that the amplifier does not produce mixing products on account of non-linear behavior, its linear region must be very large. That means that the amplifier must provide a significantly higher peak power as compared to the mean power. This makes the amplifier significantly more expensive. If the differences of the individual frequencies are unfavorable with respect to one another, mixing products can occur, which has the effect, for example when using a white light laser as the light source, that undesirable colors also appear.

SUMMARY

In an embodiment, the present invention provides a method for driving an acousto-optic element with an acousto-optic crystal and a piezoelectric transducer for setting the acousto-optic crystal in mechanical vibration. The piezoelectric transducer is driven with a drive signal with at least one drive frequency. The at least one drive frequency in alternation takes on a plurality of different values around a center frequency during a passage of a mechanical vibrational wave through the acousto-optic crystal, such that a grating that is produced owing to density fluctuations in the acousto-optic crystal exhibits different grating spacings at the same time.

BRIEF DESCRIPTION OF THE DRAWINGS

Embodiments of the present invention will be described in even greater detail below based on the exemplary figures. The present invention is not limited to the exemplary embodiments. All features described and/or illustrated herein can be used alone or combined in different combinations in embodiments of the present invention. The features and advantages of various embodiments of the present invention will become apparent by reading the following detailed description with reference to the attached drawings which illustrate the following.

DETAILED DESCRIPTION

Figure 1:
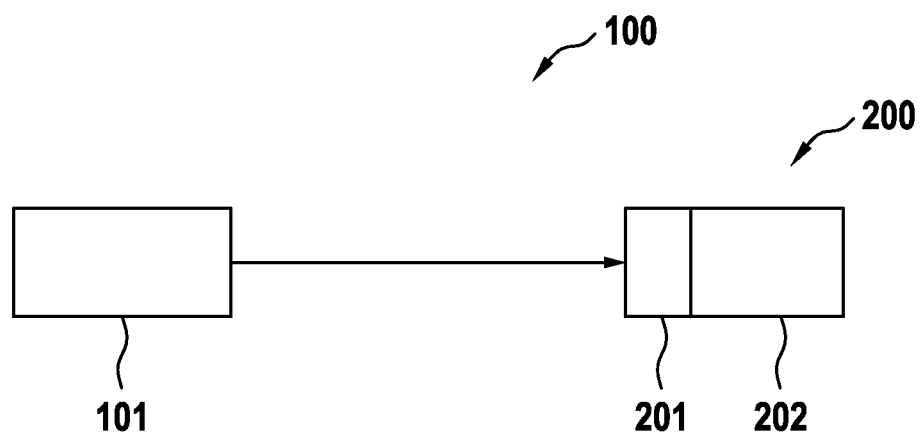
FIG. 1 shows an arrangement according to an embodiment of the invention.

Embodiments of the present invention provide a method and a signal generator for driving an acousto-optic element, an arrangement of such a signal generator and an acousto-optic element, and a microscope having such an arrangement.

An embodiment of the present invention is based on the measure of applying a sound wave to an acousto-optic crystal, the frequency of which varies so quickly over time that effectively a grating having a plurality of grating constants is formed.

As is known, a sound wave in an acousto-optic crystal produces a grating structure having a grating constant that is dependent on the frequency of the sound and on the speed of sound in the crystal. If a laser beam travels through said grating structure and if the dimensions of the structure and the wavelength of the light match, some of the laser light is deflected by a diffraction process. Some light is continuously deflected along the beam path in the sound field. When considering the quantity of the deflected light along a small part of the beam path in the sound field, it is correlated to the sound power and thus the form of the grating produced by the sound. The amplitude and thus the form of the grating consequently determines the quantity of the deflected light. The maximum of the quantity of the deflected light is achieved when all light of the quantity that is deflectable in principle has been deflected at the site at which the light beam leaves the sound field.

If the sound-generating frequency is not constant but in alternation takes on a plurality of different values around a center frequency, a grating structure with grating constants that change from zone to zone is obtained. This plurality of different values will also be referred to below as center frequency spectrum. The center frequency itself can, but does not have to be a constituent part of the center frequency spectrum.

Each of these zones deflects light from a specific wavelength range. Since the light beam successively travels through a plurality of zones, some light of a different wavelength is deflected in each zone. In order to deflect the same quantity of light as in the monochromatic case, the grating intensity and thus the sound power can be somewhat higher. If the frequencies are switched sufficiently rapidly, there will always be a plurality of zones of the same grating constant in the crystal. In that case it is ensured that the spectrum of the deflected light is constant over time.

To ensure that the drive frequency can in alternation take on a plurality of different values around a center frequency during a passage of a mechanical vibrational wave through the acousto-optic crystal, switching takes place in consideration of the crystal dimensions and the speed of sound in the crystal. The time that is required by a mechanical vibrational wave to traverse the crystal and during which the frequency of the drive signal must take on at least two different values at least once is based on said variables. However, during that time, said frequency preferably takes on the at least two different values a plurality of times.

The drive frequency preferably takes on two to eight different values. This is practicable since, in this way, different wavelength ranges of light can be deflected, but at the same time the switching can be fast enough to ensure that the intensity of the respectively deflected light is sufficiently high. The plurality of different values are preferably within a bandwidth of 50 kHz-1 MHz around the center frequency.

In particular, the drive signal has a constant amplitude for each drive frequency. However, different amplitudes for the different drive frequencies are also conceivable. In particular, it may be advantageous to apply a higher amplitude in the case of higher frequencies due to the attenuation behavior.

Further advantages and configurations of embodiments of the invention are evident from the description and the attached drawings.

An appropriate type of switching should be without gaps, that is to say the curve of the drive signal of the sound generation should be continuous. If this were not the case, undesirable harmonics would be produced. Furthermore, a frequency should be applied for at least one complete period, preferably a plurality of complete periods, so as to construct a clear grating structure. Owing to the alternating application of different frequencies, it is ensured that, from each center frequency spectrum, only ever one frequency in a time interval is present at the crystal. In other words, it is not possible to form intermodulation products with other frequencies. Likewise it is not possible to produce high power peaks by way of beats.

Advantageously, the at least one drive frequency is periodically changed quickly such that a light beam that is incident in the acousto-optic crystal—in particular not perpendicularly to the mechanical vibrational wave—impinges on the same grating spacing at least twice. It is ensured here that the spectrum of the deflected light is constant over time. It is also conceivable here that the at least one drive frequency is periodically changed quickly such that the light beam impinges on the same grating spacing at least three or more times. In this way, a uniformity of the light deflection can be improved further.

Since the crystal can superimpose density fields, it is possible to use this method in the same crystal with different center frequencies at the same time. If the center frequencies are spaced apart accordingly, the aforementioned advantages of the method are largely maintained.

It is to be understood that the aforementioned features and the features which will be explained below can be used not only in the respectively stated combination, but also in other combinations or alone, without departing from the scope of embodiments of the present invention.

FIG. 1 schematically shows an arrangement 100 according to a preferred embodiment of the invention.

The arrangement 100 comprises a signal generator 101. The latter serves to drive an acousto-optic element 200, which includes an acousto-optic crystal 202 and a piezoelectric transducer 201 for setting the crystal 202 in mechanical vibration. The acousto-optic element serves for influencing light in a desired manner, for example as an AOTF. The mechanical vibrations cause density fluctuations in the crystal that act as an optical grating, as indicated in FIG. 3.

The signal generator 101 is set up to drive the piezoelectric transducer 201 with a drive signal 300 with at least one drive frequency f, wherein the at least one drive frequency f takes on, in alternation, a plurality of different values around a center frequency during a passage of a mechanical vibrational wave 301 through the acousto-optic crystal 202, with the result that a grating that is produced owing to density fluctuations in the acousto-optic crystal 202 exhibits different grating spacings at the same time.

Figure 2:
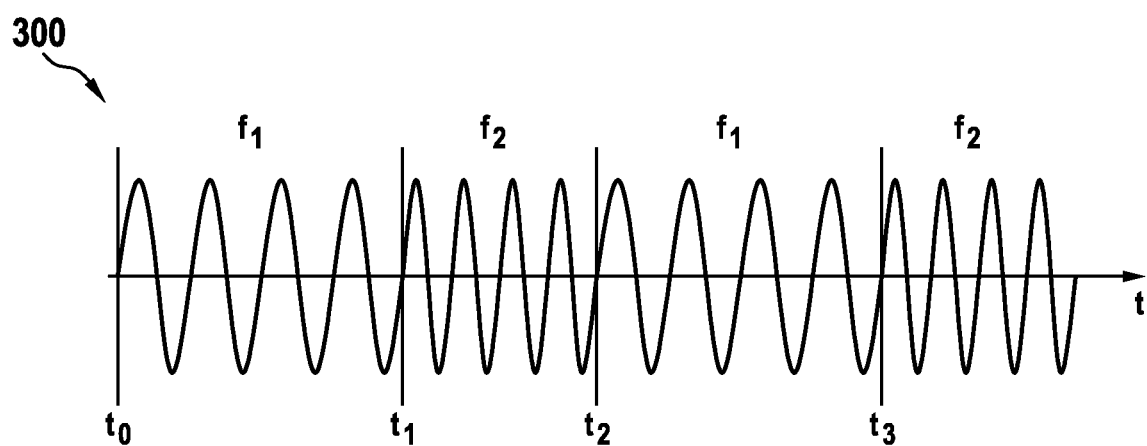
FIG. 2 shows a profile of a drive signal for a piezoelectric transducer in accordance with an embodiment of a method according to the invention.

FIG. 2 shows an example of such a drive signal 300. It can be seen that the drive frequency f takes on two different values $f_1$, $f_2$ in alternation. In particular, it adopts the value $f_1$ between the time point to and the time point $t_1$, the value $f_2$ between $t_1$ and $t_2$, the value $f_1$ between $t_2$ and $t_3$ and the value $f_2$ between $t_3$ and $t_4$. Even though the values of the drive frequency $f_1$, $f_2$ alternate, the curve of the drive signal 300 is continuous and without gaps. It is furthermore clear that the drive frequency f of the drive signal 300 is always in each case constant for at least one vibration period, more specifically in this example in each case for exactly four vibration periods.

Figure 3:
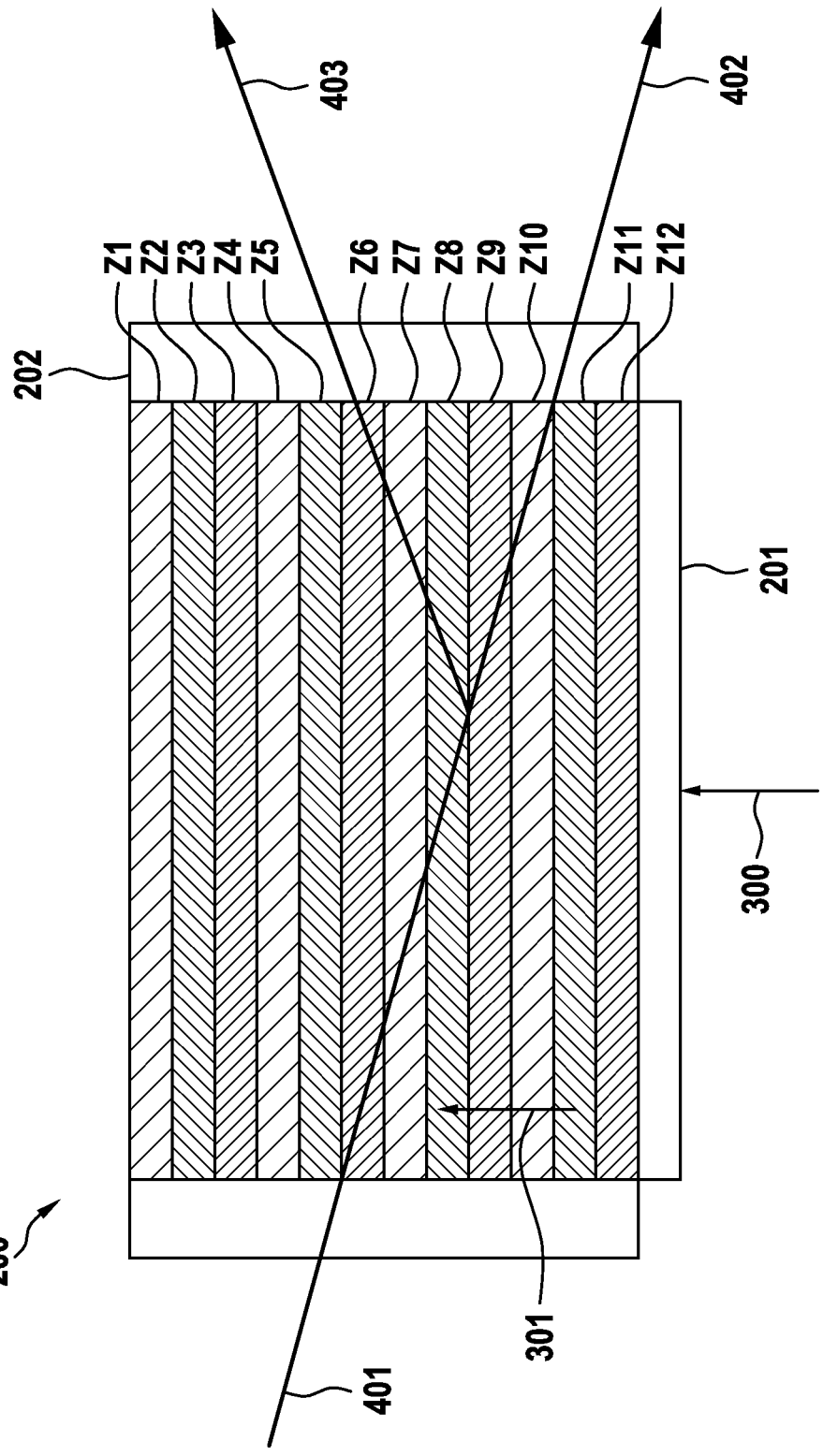
FIG. 3 shows an acousto-optic element that is driven in accordance with an embodiment of a method according to the invention.

FIG. 3 shows an acousto-optic element 200 that is driven in accordance with an embodiment of a method according to the invention. The acousto-optic element 200 includes an acousto-optic crystal 202 and a piezoelectric transducer 201 for setting the crystal 202 in mechanical vibration. The piezoelectric transducer 201 is driven with a drive signal 300 having at least one drive frequency f, wherein the at least one drive frequency f here takes on three different values in alternation as a mechanical vibrational wave travels through the acousto-optic crystal 202.

The result is a mechanical vibrational wave 301 that propagates as an acoustic sound wave through the acousto-optic crystal 202. This produces a grating structure having grating constants that change from zone to zone, wherein FIG. 3 illustrates the grating structure for a specific time point.

Said zones are marked by different types of hatching and denoted with z1, z2, z3, z4, z5, z6, z7, z8, z9, z10, z11 and z12. A grating constant repeats after every three zones. In this way, zones z1, z4, z7 and z10, and zones z2, z5, z8 and z11, and zones z3, z6, z9 and z12 each exhibit the same grating constant. This is illustrated in the figure by way of zones of the same grating constant each having the same type of hatching.

The acousto-optic crystal serves for deflecting light beams. If a light beam travels through said grating structure and if the dimensions of the structure and the wavelength of the light match, some of the light beam is deflected by a diffraction process. Each of these zones deflects light of a specific wavelength range. Since the light beam successively travels through a plurality of zones z1, . . . , z12, some light of a different wavelength is deflected in each zone. An incident light beam has been drawn and is denoted with 401. A light beam that has not been deflected is denoted with 402. A deflected light beam is denoted with 403.

Advantageously, the at least one drive frequency 300 is periodically changed quickly such that a light beam 401 that is incident in the acousto-optic crystal 202 impinges on the same grating spacing at least twice. This is the case with the drawn incident light beam 401, for example for the zones z6 and z9, or z7 and z10.

Figure 4:
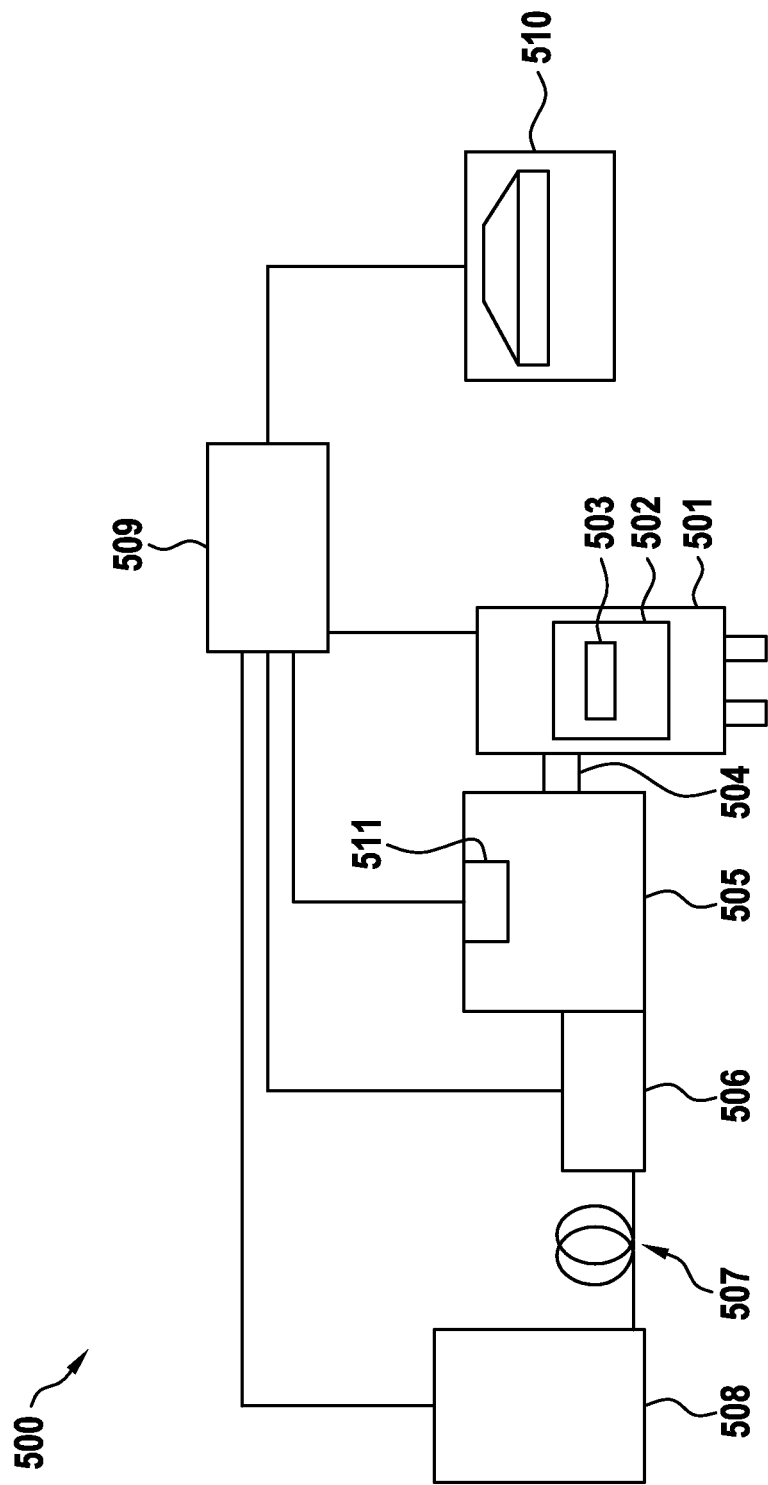
FIG. 4 shows a schematic overview of the typical elements of a confocal microscope.

FIG. 4 schematically shows a confocal microscope having typical components. 500 denotes the overall system. The confocal scanning and detection unit is denoted with 505. The associated illumination device is denoted with 506. An arrangement in accordance with FIG. 1 is provided in the illumination device.

508 is here a laser light source that is connected to the illumination device 506 via an illumination fiber 507. The laser light is influenced in the illumination device 506, if desired, using an acousto-optic element.

504 denotes an optical adapter for the confocal scanning and detection unit 505 on the microscope stand 501. The object stage 502, with a sample 503 that is to be examined, is located within the stand 501. A control unit 509 is connected to the individual components 508, 506, 505 and 501 via corresponding connecting lines. A computer with control and presentation programs is denoted with 510; it too is connected to the control unit 509.

In a first variant, a conventional confocal beam path, constructed in a known manner with an individual pinhole and a beam scanner, for example a mirror scanner, is arranged within the confocal scanning and detection unit 505.

In a second variant, a beam path in which the sample is illuminated simultaneously with one or more illumination spots or illumination spots that are extended in one direction is located within the confocal scanning and detection unit 505. Accordingly, the photons that are to be detected are selected for example with a geometric arrangement of pinholes.

The sample 503 that is to be examined is illuminated using a microscope optical unit and imaged, via the same microscope optical unit, in particular onto a sensor arrangement 511 that consists, depending on the embodiment of the confocal scanning and detection unit 505, of a photomultiplier or an array of photomultipliers. The operating principle of a system 500 illustrated in FIG. 4 per se is sufficiently known and will therefore not be explained here.

While embodiments of the invention have been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE SIGNS

100 Arrangement
101 Signal generator
200 Acousto-optic element
201 Piezoelectric transducer
202 Acousto-optic crystal
300 Drive signal
301 Mechanical vibrational wave
401 Incident light beam
402 Undeflected light beam
403 Deflected light beam
500 Microscope system
501 Microscope stand with microscope optical unit
502 Object stage
503 Sample
504 Optical adapter

505 Confocal scanning and detection unit
506 Illumination device
507 Illumination fiber
508 Laser light source
509 Control unit with signal generator
510 Computer with control and presentation programs
511 Sensor arrangement

The invention claimed is:

1. A method for driving an acousto-optic element with an acousto-optic crystal and a piezoelectric transducer for setting the acousto-optic crystal in a mechanical vibration, the method comprising:
   driving the piezoelectric transducer with a drive signal with at least one drive frequency,
   wherein the at least one drive frequency in alternation takes on a plurality of different values around a center frequency during a passage of a mechanical vibrational wave through the acousto-optic crystal, such that a grating that is produced owing to density fluctuations in the acousto-optic crystal exhibits different grating spacings at the same time, the grating having grating constants that change from zone to zone across the acousto-optic crystal, and
   wherein, at a point in time during the passage of the mechanical vibrational wave through the acousto-optic crystal, the grating constants repeat such that non-adjacent ones of the zones exhibit a same grating spacing.

2. The method as claimed in claim 1, wherein the plurality of different values are within a bandwidth of 50 kHz-1 MHz around the center frequency.

3. The method as claimed in claim 1, wherein the plurality of different values around the center frequency comprise three to ten values overall.

4. The method as claimed in claim 1, wherein the at least one drive frequency is periodically changed at such a rate that a light beam that is incident in the acousto-optic crystal impinges on at least two of the non-adjacent ones of the zones that exhibit the same grating spacing.

5. The method as claimed in claim 4, wherein the at least one drive frequency is periodically changed at such a rate that the light beam impinges on at least three of the non-adjacent ones of the zones that exhibit the same grating spacing.

6. The method as claimed in claim 1, wherein each drive frequency of the at least one drive frequency is constant for at least one complete vibration period of each drive frequency.

7. The method as claimed in claim 6, wherein each drive frequency of the at least one drive frequency is constant for at least two complete vibration periods of each drive frequency.

8. The method as claimed in claim 1, wherein the drive signal has a plurality of drive frequencies at the same time that each take on different values around, in each case, one center frequency.

9. The method as claimed in claim 1, wherein a curve of the drive signal is continuous and without gaps.

10. An arrangement comprising the at least one signal generator as claimed in claim 9 and an acousto-optic element.

11. The arrangement as claimed in claim 10, wherein the acousto-optic element is one of: an acousto-optically tunable filter, an acousto-optic modulator, an acousto-optic deflector, an acousto-optic beam splitter, and an acousto-optic beam combiner.

12. A signal generator for driving an acousto-optic element, configured to perform the method as claimed in claim 1.

13. A microscope comprising the arrangement as claimed in claim 12.

14. The method as claimed in claim 1, wherein the at least one drive frequency comprises at least two drive frequencies, each of the at least two drive frequencies having a respective center frequency, and the center frequencies being different from each other.

15. The method as claimed in claim 1, wherein the at least one drive frequency alternates back and forth between two different values around the center frequency.

16. The method as claimed in claim 1, wherein the grating constants repeat such that at least three non-adjacent ones of the zones, on which a light beam incident on the acousto-optic crystal impinges during the passage of the mechanical vibrational wave through the acousto-optic crystal, have a same grating spacing.

17. The method as claimed in claim 1, wherein each of the different values of the plurality of different values that the at least one drive frequency in alternation takes on correspond to at least one of the different grating spacings during the passage of the mechanical vibrational wave through the acousto-optic crystal.

\* \* \* \* \*